Nov. 30, 1926. 1,609,122
J. F. O'CONNOR
FRICTION SHOCK ABSORBING MECHANISM
Filed April 30, 1925   2 Sheets-Sheet 2
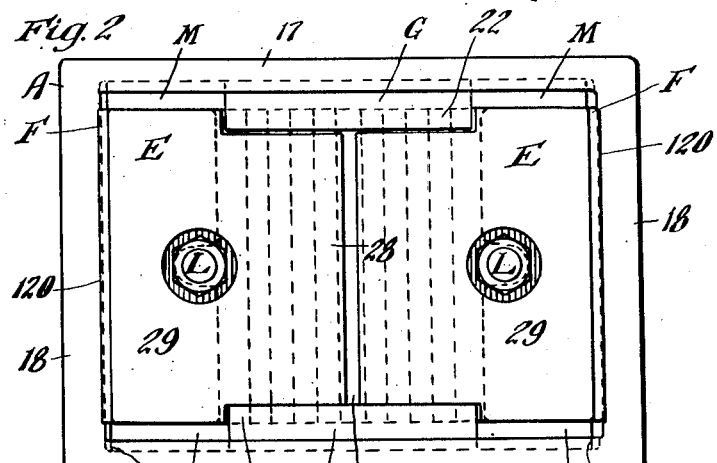
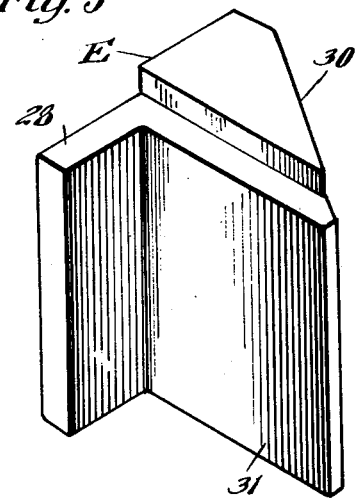
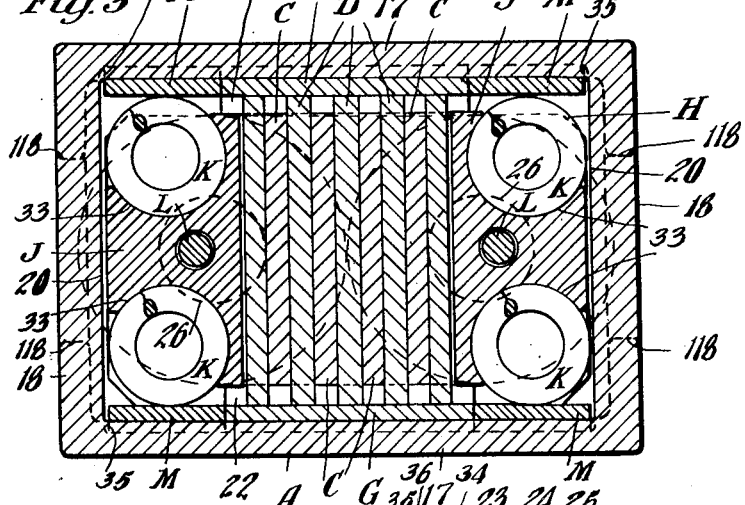
Witness
Wm. Geiger
Inventor
John F. O'Connor
By George I. Haight
His Atty.

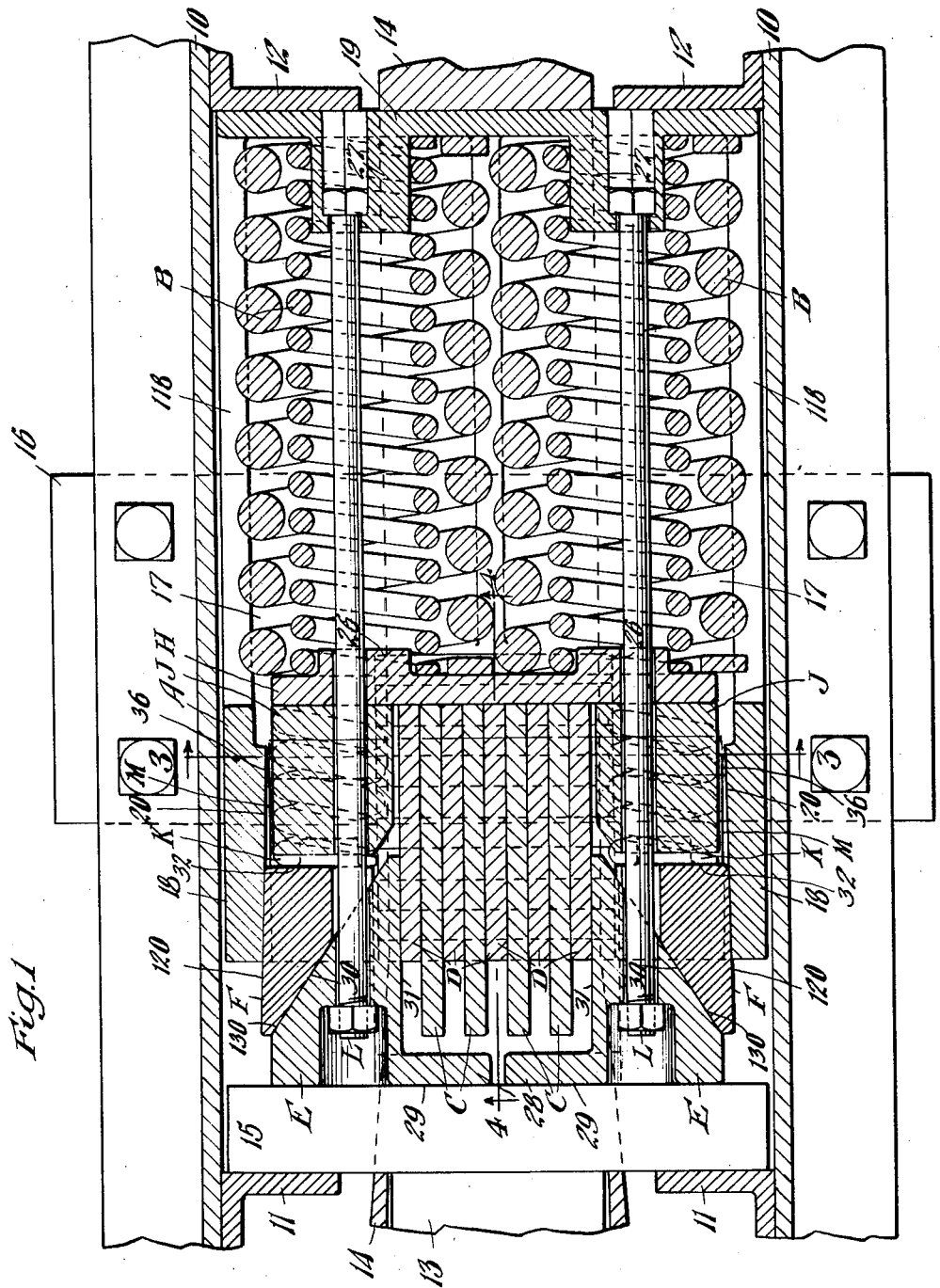

Patented Nov. 30, 1926.

1,609,122

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 30, 1925. Serial No. 26,898.

This invention relates to improvements in friction shock absorbing mechanism.

One object of the invention is to provide a high capacity shock absorbing mechanism, especially adapted for railway draft riggings, having graduated action during the compression stroke, the resistance offered progressively increasing from an initial light preliminary action to the ultimate high capacity of the gear.

Another object of the invention is to provide a shock absorbing mechanism of the character indicated, offering progressively increasing resistance during the compression stroke and having high final capacity produced by relative movement of a plurality of intercalated friction plates.

A further object of the invention is to provide a friction shock absorbing mechanism having progressively increasing capacity during the compression stroke, the resistance being augmented in four stages.

Still another object of the invention is to provide a friction shock absorbing mechanism offering progressively increasing resistance, having light initial combined frictional and spring resistance, followed successively by an increased spring resistance and a very heavy final combined frictional and spring resistance.

A more specific object of my invention is to provide a friction shock absorbing mechanism having graduated action, including a friction shell, relatively movable intercalated friction plates, lateral pressure creating means for bringing the friction plates into intimate contact, and main and auxiliary spring resistance elements wherein the lateral pressure creating means and friction shell are relatively movable to produce frictional resistance, the progressively increasing capacity of the mechanism being produced by successively resisting relative movement of the pressure creating means and shell first, by the auxiliary spring augmented by friction between the pressure creating means and certain of the friction plates, and then by the main spring resistance; there being three stages of resistance during the action of the main spring, first by the movement of the pressure creating means and plates in unison, second by relative movement of the pressure creating means and plates and, third, by an added relative movement of the plates with reference to each other.

Other objects and advantages of the invention will more fully and clearly appear from the description and claims hereinafter following.

In the drawing, forming a part of this specification, Figure 1 is a longitudinal, horizontal, sectional view of a portion of a railway draft rigging, showing my improvements in connection therewith. Figure 2 is a front end, elevational view of the shock absorbing mechanism proper. Figure 3 is a vertical, transverse, sectional view of the shock absorbing mechanism corresponding substantially to the line 3—3 of Figure 1. Figure 4 is a longitudinal, vertical, sectional view of the forward end of the shock absorbing mechanism, corresponding substantially to the line 4—4 of Figure 1. And Figure 5 is a detailed, perspective view of a wedge block used in connection with my improved mechanism.

In said drawings, 10—10 indicate channel-shaped center sills of a railway car underframe, to the inner faces of which are secured front stop lugs 11—11 and rear stop lugs 12—12. The inner end portion of the drawbar is designated by 13, to which is operatively connected a hooded yoke 14 of well-known form. The shock absorbing mechanism proper, hereinafter more fully described, as well as a main follower 15 are disposed within the yoke. The yoke and the parts contained therein are supported in operative position by a detachable saddle plate 16 fixed to the respective draft sills.

My improved shock absorbing mechanism comprises broadly, a combined spring cage and friction shell casting A; twin arranged main spring resistance elements B—B; two sets of friction plates C and D; two wedge blocks E—E; two friction shoes F—F; two carrier elements G—G; a main spring follower H; two pressure transmitting blocks J—J; four preliminary springs K—K; two retainer bolts L—L; and four wear plates M—M.

The combined spring cage and friction shell casting A is in the form of a hollow, rectangular casing having spaced, horizontally disposed top and bottom walls 17—17; spaced vertical side walls 18—18; and a transverse, vertical, end wall 19 at the rear, co-operating with the stop lugs 12 in the manner of the usual rear follower. As clearly shown in Figure 1, the side walls 18 of the casing are provided with longitudinal openings 118 extending from the transverse end wall 19 to within a short distance of the front end of the cage, thereby facilitating the assembling of the main spring resistance elements B—B, as hereinafter more fully described, the springs being entered from the front opening of the cage. At their front ends the side walls 18 of the casting A are provided with opposed, inwardly converging friction surfaces 20, thereby providing a friction shell section at the forward end of the casting. The rear end of the casting forms the spring cage section proper thereof.

The friction plates C and D are arranged in a group centrally of the mechanism, the plates C being alternated with the plates D. The friction plates D are preferably five in number, two of said plates being disposed outermost of the group. The plates C which are interposed between the plates D are in this instance shown as four in number. The five plates D are preferably all of like construction, each plate as most clearly shown in Figure 4 being of generally rectangular outline and having two series of lugs 21—21 projecting from the top and bottom edges thereof. The lugs 21 are preferably eight in number, four being disposed at the top and four at the bottom of each plate. The lugs 21 serve as a means for anchoring the plates D to the carrier elements G as more clearly hereinafter described. The four plates C, as shown, are also of generally rectangular form and are longer than the plates D. In the normal position of the parts, the plates as assembled are arranged so that the inner ends of all of the plates C and D are in alinement while the outer ends of the plates C project beyond the corresponding ends of the plates D.

The carrier elements G are disposed respectively above and below the group of friction plates. Each of the carrier elements is in the form of a relatively heavy rectangular plate, slightly exceeding in width the width of the group of assembled friction plates. Each of the plates G is provided with a plurality of transversely extending ribs 22—22 on one side thereof, the ribs 22 of the top plate projecting downwardly and the ribs 22 of the bottom plate projecting upwardly. As most clearly shown in Figure 4, the lugs 21 of the plates D are engaged between the ribs 22 of the top and bottom carrier elements, thereby anchoring the plates D to the carrier elements for movement in unison therewith. In this connection, it is pointed out that each of the carrier elements has five ribs 22, the front and rear ribs of the series engaging respectively in front of and in back of the front and rear lugs 21 at the corresponding edges of the plates D. Each carrier element G is also provided with a transverse rib 23 on the side opposite to the ribs 22, the rib 23 having its rear edge in alinement with the rear edge of the carrier and the opposed rib 22, thereby presenting a flat abutment face 24 adapted to co-operate with an abutment shoulder 25 on the corresponding wall 17 of the casting A. The abutment shoulders 24 are disposed in vertical alinement so that the inner ends of the carrier elements G will simultaneously engage the same to arrest inward movement of the same. Outward movement of the carrier elements G is limited by a second set of transverse shoulders 34 provided on the top and bottom walls of the casting A, as most clearly shown in Figure 4.

The spring follower H which is preferably in the form of a heavy rectangular plate, has its front face normally engaging the inner ends of all of the plates C and D and also the inner ends of the pressure transmitting blocks J and the preliminary springs K. As clearly shown in Figures 1 and 4, the spring follower is of a width slightly less than the width of the friction shell, and of a height less than the distance between the top and bottom carrier plates G, thereby permitting entering the follower from the front of the friction shell.

The main spring resistance elements B which are twin arranged, are interposed between the end wall 19 of the casting A and the spring follower H. Each member of the twin arranged main springs B comprises a relatively heavy outer coil and a light inner coil, the inner coil being held in centered position by bosses 26 and 27 projecting respectively from the spring follower H and the transverse end wall 19 of the casting. It will be evident that two sets of lugs 26 and 27 are provided one for each member of the spring resistance.

The wedge blocks E are of like design, each being preferably in the form of a cored casting having a laterally projecting, vertically disposed flange 28 on the inner side thereof. The flanges 28 of the two blocks E extend toward each other and have their inner ends slightly spaced apart as most clearly illustrated in Figure 1. The inner surfaces of the flanges 28 are normally slightly spaced from the outer ends of the plates C and are adapted to engage the same after a predetermined relative movement of the wedges E and the group of plates. The flanges 28 are of such a length that each will engage two of the plates C at the corresponding side of the mechanism. At the outer end, each wedge block E has a flat transverse face 29 adapted to bear on the inner side of the main follower 15. Each block E is also provided with a wedge face 30 at the inner end thereof. The wedge face 30 of the two blocks converge inwardly of the mechanism as most clearly shown in Figure 1. On the inner side, each wedge block has a longitudinally disposed friction surface 31 adapted to co-operate with the outer surface of the outermost plate D at the corresponding side of the group.

The two friction shoes F are also of like construction, each shoe being in the form of a block having a longitudinally disposed, flat, outer surface 120 adapted to co-operate with the corresponding friction surface 20 of the friction shell. At the inner end, each block F is provided with a flat bearing face 32 forming an abutment for the front ends of the corresponding preliminary springs K. On the inner side, each block is provided with a wedge face 130 correspondingly inclined to and adapted to co-operate with the wedge face 30 of one of the wedge blocks E.

The preliminary springs K are preferably four in number, being arranged in pairs at opposite sides of the mechanism, one member of each pair being disposed at the top and the other member at the bottom thereof.

The pressure transmitting blocks J which are of identical construction are disposed at opposite sides of the mechanism, being interposed between the main spring follower H and the wedge friction shoes F. Each block J is provided with a pair of recesses 33 at the top and bottom thereof to freely accommodate the corresponding preliminary springs K. As most clearly shown in Figure 3, the blocks are of such a length that in the normal position of the parts, the front ends are spaced a slight distance from the inner ends of the friction shoes F. In this connection, it is pointed out that the clearance between the outer ends of the plates C and the flanges 28 is appreciably greater than the clearance between the outer ends of the blocks J and the friction shoes F, thereby permitting engagement of the inner ends of the shoes with the blocks J prior to engagement of the flanges 28 with the plates C during the compression stroke of the mechanism.

The wear plates M are all preferably of like design, each being of rectangular outline and having a transverse flange or rib 35 at the inner end thereof. The plates M are arranged in pairs at opposite sides of the mechanism, the plates of each pair being interposed between the corresponding wedge system and the top and bottom walls of the friction shell respectively. The plates M are anchored to the shell by the flanges 34, the top and bottom walls of the shell being provided with transverse slots 36 to receive the flanges.

The retainer bolts L are preferably two in number and are disposed at opposite sides of the mechanism, each bolt having one end thereof anchored within the corresponding boss 27 of the casing A and the other end anchored to the wedge block E at the corresponding side of the mechanism. As shown in Figure 1, the wedges E and the bosses 27 are recessed to accommodate the nuts and the heads of the bolts for the required sliding movement during compression of the mechanism. The shanks of the bolts extend through alined openings in the spring follower H, pressure transmitting blocks J, wedge friction shoes F and wedges E, the openings in the friction shoes F being of such a size as to provide sufficient clearance for the lateral inward movement of the shoes due to the converging relation of the friction surfaces of the friction shell. The retainer bolts L maintain the mechanism of uniform overall length and hold the preliminary springs under initial compression. In this connection, it is pointed out that when the parts are assembled, the spring follower H which is in abutment with the inner ends of the friction plates, also maintains the main springs B under an initial compression. Compensation for wear of the various friction and wedge faces is had by the expansive action of the preliminary springs K which as hereinbefore pointed out are under initial compression.

In assembling the mechanism, the twin arranged main springs B are first assembled with the spring cage, one of the large coils thereof being first entered into the spring cage through the front end of the friction shell. This coil is then laterally shifted to permit insertion of the other large coil in a similar manner, the opening in the corresponding side wall of the shell permitting the necessary lateral shifting of the first named coil. After the two large coils have been placed in position, the two small coils are telescoped therewithin. The main spring follower is then inserted through the front end of the friction shell. The carrier elements G are next placed within the friction shell, and the plates D are then assembled therewith by inserting the same at either side of the mechanism and bringing the lugs 21 thereof into alinement with the openings between the ribs 22 of the carrier elements and sliding the plates laterally so as to engage the lugs 21 between the ribs 22. The plates C are then inserted between the plates D. The wear plates M are next placed in position. The pressure transmitting blocks J, springs K, wedge friction shoes F, and wedge blocks E are then assembled with the casing A, and the parts secured by the retainer bolts L.

The operation of my improved shock absorbing mechanism, assuming a compression stroke, is as follows: The front follower 15 and the casting A are moved relatively toward each other. During this relative movement the wedge blocks E will be carried inwardly of the friction shell, thereby setting up a wedging action between the wedge blocks and the friction wedge shoes F and also carrying the shoes inwardly of the friction shell on the friction surfaces 20 thereof. During this action, the preliminary spring resistance elements K will be compressed while the main spring follower H is held in relatively fixed position by the heavier springs B. Due to the inwardly converging relation of the friction surfaces 20 of the shell, the friction shoes F will be advanced more rapidly than the wedge blocks E, there being slippage on the wedge faces 30 and 130. This action will result in an additional compression of the preliminary springs K. Friction will also be created between the outermost plates D of the group and the friction surfaces of the wedge blocks E, the plates at this time being held in fixed position by the spring follower H. This action will continue until the clearance between the inner ends of the friction shoes F and the pressure transmitting blocks is taken up, whereupon compression of the preliminary springs will be limited and the blocks J carried rearwardly in unison with the friction shoes F, forcing the spring follower H rearwardly also and compressing the main spring resistance elements B. As the main spring resistance B is of much greater capacity than the preliminary springs J, the resistance offered will be greatly augmented. During this action, the friction plates which are gripped tightly between the wedge blocks E will be carried rearwardly as a unit with the remaining parts of the mechanism, there being at this time no friction created between the plates and the wedge blocks E. As compression of the mechanism continues, the inner ends of the carrier elements G will be brought into abutment with the transverse shoulders 25 of the casting A and movement of the carrier elements arrested, thereby also arresting movement of the friction plates D which are anchored thereto. Upon movement of the plates D being arrested, the wedge blocks E will be forced to slide on the outermost plates D, thereby still further augmenting the frictional resistance offered. The relative movement of the wedges E with reference to the plates C and D will continue until the flanges 28 of the wedges come into abutment with the outer ends of the plates C, whereupon the latter will be forced inwardly of the friction shell with reference to the now stationary plates D, thereby greatly augmenting the resistance offered. The described action will continue either until the actuating force is reduced or until the main follower engages the outer end of the casting A, whereupon compression of the main springs B will be limited and the actuating force transmitted directly through the casting A to the corresponding stop lugs of the draft sills. It will be evident that during the compression of the mechanism, the spring follower will be moved out of engagement with the inner ends of the friction plates, C and D, so that when the plates are returned to normal position by the main springs B during release, the spring follower will act to restore the remaining parts of the mechanism before any movement of the friction plates is effected, thereby greatly facilitating release.

During release, the main springs B will return the spring follower H, pressure transmitting blocks J, springs K, wedge friction shoes F and wedge blocks E to normal position. As the spring follower moves outwardly, the same will approach the inner ends of the plates C, forcing the same outwardly with reference to the plates D and bringing the inner ends of the plates C and D in alinement. The outward movement of the spring follower will be arrested upon engagement of the ribs 23 of the carriers G with the transverse shoulders 34 of the casting A.

By providing the graduated action comprising the four stages of successively increasing resistance, the gear is particularly adapted for passenger car service, as abrupt and sudden shocks are entirely eliminated due to the blending of the different stages of the compression of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column-load-sustaining member; of a plurality of intercalated relatively movable friction elements, said elements being movable as a unit during the compression stroke; means for arresting movement of certain of said elements after a predetermined portion of the compression stroke; a follower, said follower and member being movable relatively toward and from each other; a combined restoring and cushioning spring resistance; lateral pressure creating means disposed and operating on the outer sides of said elements and arranged to exert opposite and inwardly directed lateral pressure on said elements upon relative approach of said follower and member; and an auxiliary spring resistance co-operating with said lateral pressure creating means.

2. In a friction shock absorbing mechanism, the combination with a column-load-sustaining member; a follower, said member and follower being movable relatively toward and from each other; a plurality of intercalated, relatively movable friction elements movable as a unit during relative movement of said member and follower; means for arresting movement of certain of said elements after a predetermined portion of the compression stroke to compel relative movement of said elements; a combined restoring and cushioning spring resistance; lateral pressure creating means co-operating with said elements to place them under lateral pressure upon relative movement of said follower and member; and an auxiliary spring resistance co-operating with said lateral pressure creating means.

3. In a friction shock absorbing mechanism, the combination with a column-load-sustaining member; a follower, said member and follower being movable relatively toward and from each other; a plurality of intercalated, relatively movable friction elements movable as a unit during relative movement of said member and follower; means for arresting movement of certain of said elements after a predetermined portion of the compression stroke to compel the remaining elements to move relatively thereto; a combined restoring and cushioning spring resistance; and lateral pressure creating means cooperating with said elements to place them under lateral pressure upon relative movement of said follower and member, said lateral pressure creating means also having engagement with said remaining elements to effect movement thereof with reference to the column-load-sustaining member.

4. In a friction shock absorbing mechanism, the combination with a column-load-sustaining member; of a plurality of alternated friction elements, said elements being adapted for movement in unison during a portion of the compression stroke; a follower; said member and follower being movable relatively toward and from each other; lateral pressure creating means disposed and operating on the outer sides of said elements and arranged to exert opposite and inwardly directed lateral pressure on said elements upon approach of said follower and member and also adapted for movement relative to said friction elements; an auxiliary spring initially resisting relative movement of said lateral pressure creating means; and a main spring resistance adapted to be compressed by movement of said lateral pressure creating means after a predetermined compression of said preliminary springs.

5. In a friction shock absorbing mechanism, the combination with a column-load-sustaining member; of a follower, said member and follower being movable relatively toward and from each other; lateral pressure creating means actuated upon relative movement of said member and follower; a preliminary spring resistance initially opposing relative movement of said member and pressure creating means; a main spring resistance; means for transferring the resistance from said auxiliary spring to the main spring after a predetermined compression of the mechanism; a plurality of intercalated friction plates adapted for movement in unison during relative movement of said member and follower; and means for arresting movement of certain of said plates after a predetermined compression of the main spring resistance to compel relative movement of said plates during the remainder of the compression stroke.

6. In a friction shock absorbing mechanism, the combination with a column-load-substaining member; of a plurality of intercalated friction plates; a carrier on which said plates are mounted, certain of said plates being fixed to the carrier and the remaining plates being movable relatively thereto; means for arresting movement of said carrier and plates fixed thereto after a predetermined compression of the mechanism; a follower, said member and follower being movable relatively toward and from each other; a lateral pressure creating means disposed and operating on the outer sides of said plates and arranged to exert opposite and inwardly directed lateral pressure on said plates upon relative approach of said follower and member; and preliminary and main spring resistance elements successively resisting inward movement of said lateral pressure creating means with reference to said member during initial compression of the mechanism.

7. In a friction shock absorbing mechanism, the combination with a friction member having longitudinally disposed friction surfaces; of a pressure transmitting member, said members being relatively movable toward and away from each other; a carrier relatively movable to said friction member; a plurality of intercalated, relatively movable friction plates, certain of said plates being anchored to said carrier, means for limiting the relative movement of said carrier and friction member; lateral wedge pressure creating members co-operating with said pressure transmitting member for placing said plates under lateral pressure, said lateral pressure creating means including a plurality of friction elements engaging the friction surfaces of adjacent plates; and preliminary and main spring resistance elements successively operative for opposing relative movement of said friction elements and friction member.

8. In a friction shock absorbing mechanism, the combination with a friction shell having interior friction surfaces; of a central group of intercalated friction plates within said shell; a carrier having limited movement with reference to the shell and to which certain of said plates are anchored; wedge systems interposed between the friction surface of the shell and said group of plates, each wedge system including a wedge pressure transmitting member and a friction wedge shoe, said shoes having longitudinally disposed friction surfaces co-operating with the friction surfaces of the shell; and successively operative preliminary and main spring resistance elements co-operating with said shoes.

9. In a friction shock absorbing mechanism, the combination with a friction shell having interior friction surfaces; of a central group of intercalated friction plates within the shell; means for limiting the movement of certain of said plates with reference to the shell; a wedge system disposed at each side of said group of plates, each wedge system including a wedge pressure transmitting member and a friction shoe member, one of said members having a friction surface co-operating with the corresponding shell friction surface, and the other of said members having a friction surface co-operating with the friction surface of the outermost plate at the corresponding side of said group; and successively operative preliminary and main spring resistance elements co-operating with said shoe members.

10. In a friction shock absorbing mechanism, the combination with a friction shell having interior friction surfaces converging inwardly of the mechanism; of a plurality of intercalated friction plates within the shell; a carrier having limited movement with reference to the shell, certain of said plates being anchored to the carrier and the remainder of the plates being movable relatively thereto; a lateral wedge pressure creating means co-operating with said plurality of plates; a spring follower co-operating with the wedge pressure creating means and said movable plates for restoring the latter to normal position, said follower also acting to restore said carrier to normal position during release; and a main spring resistance co-operating with said spring follower.

11. In a friction shock absorbing mechanism, the combination with a friction shell having interior friction surfaces; of a group of intercalated friction plates bodily movable as a unit with reference to the shell; means for arresting the movement of certain of said plates after a predetermined compression of the mechanism; a pair of wedge systems interposed between said group of plates and the friction surfaces of the shell, each wedge system including a wedge pressure transmitting member and a friction shoe; a main spring resistance; a spring follower co-operating with said spring resistance; and a preliminary spring resistance interposed between the spring follower and the friction shoes.

12. In a friction shock absorbing mechanism, the combination with front and rear main stops; of a combined spring cage and friction shell co-operating with certain of said stops; a main follower co-operating with the remaining stops; a yoke co-operating with said combined spring cage and friction shell and main follower; a plurality of intercalated, relatively movable friction plates, certain of said plates having limited movement with reference to the shell; lateral pressure creating means co-operating with said main follower for compressing said plates, said means including a pair of friction elements co-operating with the friction surfaces of the shell; a preliminary spring initially resisting rearward movement of said elements; and a main spring adapted to be compressed by the movement of said elements after a predetermined compression of the preliminary spring.

13. In a friction shock absorbing mechanism, the combination with a friction shell having interior friction surfaces; of a group of intercalated friction plates bodily movable as a unit with reference to the shell; means for arresting movement of certain of said plates after a predetermined compression of the mechanism; a pair of wedge systems interposed between said groups of plates and the friction surfaces of the shell, each wedge system including a wedge pressure transmitting member and a friction shoe; a main spring resistance; a spring follower co-operating with the spring resistance; a preliminary spring resistance interposed between the spring follower and the friction shoes; and means carried by said spring follower and co-operating with the shoes for limiting the compression of said preliminary spring resistance.

14. In a friction shock absorbing mechanism, the combination with a friction shell; of a plurality of intercalated friction plates movable bodily as a unit for a limited distance with respect to the shell during a compression stroke, said plates being located centrally of the shell; two sets of wedge lateral pressure-creating means, each set being interposed between the friction shell and one side of the set of intercalated plates and co-operable with the shell and the plates; means for arresting movement of alternate ones of said friction plates at a predetermined point in a compression stroke of the mechanism to thereafter permit relative movement between intercalated plates; and spring resistance means associated with said pressure means and plates.

15. In a friction shock absorbing mechanism, the combination with a combined friction shell and spring cage, said shell having top, bottom and side walls, the side walls having opposed interior friction surfaces; of a spring resistance within said cage; relatively movable intercalated friction plates within the friction shell; wedge pressure transmitting means for placing said plates under lateral pressure, said means including friction shoes co-operating with the friction surfaces of the shell; carrier elements to which certain of said plates are anchored, said elements having limited movement with reference to the friction shell; and wear plates interposed between said friction wedge pressure transmitting means and the top and bottom walls of the shell, said wear plates being disposed on opposite sides of the carrier elements.

In witness that I claim the foregoing I have hereunto subscribed my name this 24th day of April, 1925.

JOHN F. O'CONNOR.